US012277692B2

(12) United States Patent
Wendte et al.

(10) Patent No.: US 12,277,692 B2
(45) Date of Patent: Apr. 15, 2025

(54) NON-TRANSITORY COMPUTER-READABLE MEDIA AND DEVICES FOR BLADE WEAR MONITORING

(71) Applicant: Deere & Company, Moline, IL (US)

(72) Inventors: Sara Wendte, Moline, IL (US); Jeremy J. Faust, Moline, IL (US)

(73) Assignee: Deere & Company, Moline, IL (US)

(*) Notice: Subject to any disclaimer, the term of this patent is extended or adjusted under 35 U.S.C. 154(b) by 477 days.

(21) Appl. No.: 17/514,321

(22) Filed: Oct. 29, 2021

(65) Prior Publication Data

US 2023/0135705 A1    May 4, 2023

(51) Int. Cl.
  *G06T 7/00*    (2017.01)
  *A01D 45/10*   (2006.01)
  *G05D 1/00*    (2006.01)
  *G08B 21/18*   (2006.01)

(52) U.S. Cl.
  CPC ............ *G06T 7/0002* (2013.01); *A01D 45/10* (2013.01); *G05D 1/0223* (2013.01); *G08B 21/182* (2013.01); *G06T 2207/20081* (2013.01); *G06T 2207/30188* (2013.01)

(58) Field of Classification Search
  CPC .... A01D 34/006; A01D 43/085; A01D 45/10; G05D 1/0223; G06T 2207/20081; G06T 2207/20084; G06T 2207/30164; G06T 2207/30188; G06T 7/0002; G06T 7/0004; G08B 21/182
  See application file for complete search history.

(56) References Cited

U.S. PATENT DOCUMENTS

| | | | |
|---|---|---|---|
| 3,942,307 A | 3/1976 | Quick | |
| 10,091,934 B2 | 10/2018 | Dugas et al. | |
| 10,188,037 B2 | 1/2019 | Bruns et al. | |
| 10,344,993 B2 | 7/2019 | Gettig et al. | |
| 10,827,676 B2 | 11/2020 | Dighton et al. | |
| 2018/0272491 A1* | 9/2018 | Yang | B23Q 17/0971 |
| 2020/0337235 A1 | 10/2020 | Blank et al. | |
| 2021/0076569 A1 | 3/2021 | Blank | |
| 2021/0089819 A1* | 3/2021 | Tschiatschek | G06F 21/6245 |
| 2021/0120737 A1* | 4/2021 | Wang | G06T 7/0004 |
| 2022/0007570 A1* | 1/2022 | Foster | A01D 34/78 |
| 2022/0019849 A1* | 1/2022 | Kim | G06F 16/535 |

(Continued)

OTHER PUBLICATIONS

Pérez-Reyes et al., "Performance of the Base-Cutter Blades in the Sugarcane Harvester Machines Case-IH 7000". *Revista Ciencias Técnicas Agropecuarias*. (Jun. 11, 2018).

(Continued)

*Primary Examiner* — Manuchehr Rahmjoo
(74) *Attorney, Agent, or Firm* — Harness, Dickey & Pierce, P.L.C.

(57) ABSTRACT

Provided is a non-transitory computer readable medium storing instructions that, when executed by at least one processor, cause the at least one processor to obtain a first signal based on an input image using a trained machine learning model, the input image being an image of a plant cut by a blade, and the first signal indicating a wear level of the blade, determine whether a level of the first signal is greater than or equal to a threshold, generate a second signal in response to determining the level of the first signal is greater than or equal to the threshold, and output the second signal.

23 Claims, 10 Drawing Sheets

(56) References Cited

U.S. PATENT DOCUMENTS

2022/0148172 A1\* 5/2022 Klochko ............... G06V 10/25
2022/0168862 A1\* 6/2022 Atkins ................. G06N 20/00

OTHER PUBLICATIONS

Araújo et al. "Sugarcane Harvesting Quality by Digital Image Processing." *Sugar Tech.* (Jan. 1, 2020). Available at: <http://hdl.handle.net/11449/199220>.(http://hdl.handle.net/11449/199220).

\* cited by examiner

800

| Threshold | Alert |
|---|---|
| Threshold 1 | Alert 1 |
| Threshold 2 | Alert 2 |
| . . . | . . . |
| Threshold m | Alert m |

FIG. 9

NON-TRANSITORY COMPUTER-READABLE MEDIA AND DEVICES FOR BLADE WEAR MONITORING

FIELD

Some example embodiments provide non-transitory computer-readable media and devices for blade wear monitoring. For example, non-transitory computer-readable media and devices may be provided for vision-based wear monitoring of a cutter blade of a harvester.

BACKGROUND

Harvesters separate crops, such as sugar cane, into billets using cutter blades. When these blades become worn through use, the cutting performance of the blades decreases. For example, a harvester with worn cutter blades fails to separate the crops into billets (e.g., eject billets of excessive length), fails to provide cleanly cut billets, etc. Accordingly, proper maintenance of the blades includes sharpening the blades when they become worn.

SUMMARY

Some example embodiments provide a non-transitory computer readable medium storing instructions that, when executed by at least one processor, cause the at least one processor to obtain a first signal based on an input image using a trained machine learning model, the input image being an image of a plant cut by a blade, and the first signal indicating a wear level of the blade, determine whether a level of the first signal is greater than or equal to a threshold, generate a second signal in response to determining the level of the first signal is greater than or equal to the threshold, and output the second signal.

Some example embodiments provide a device for blade wear monitoring, the device comprising processing circuitry configured to obtain a first signal based on an input image using a trained machine learning model, the input image being an image of a plant cut by a blade, and the first signal indicating a wear level of the blade, determine whether a level of the first signal is greater than or equal to a threshold, generate a second signal in response to determining the level of the first signal is greater than or equal to the threshold, and output the second signal.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For the purposes of clarity, various dimensions of the drawings may have been exaggerated.

FIG. 9 is a table of wear level alerts according to some example embodiments.

DETAILED DESCRIPTION

Figure 1:
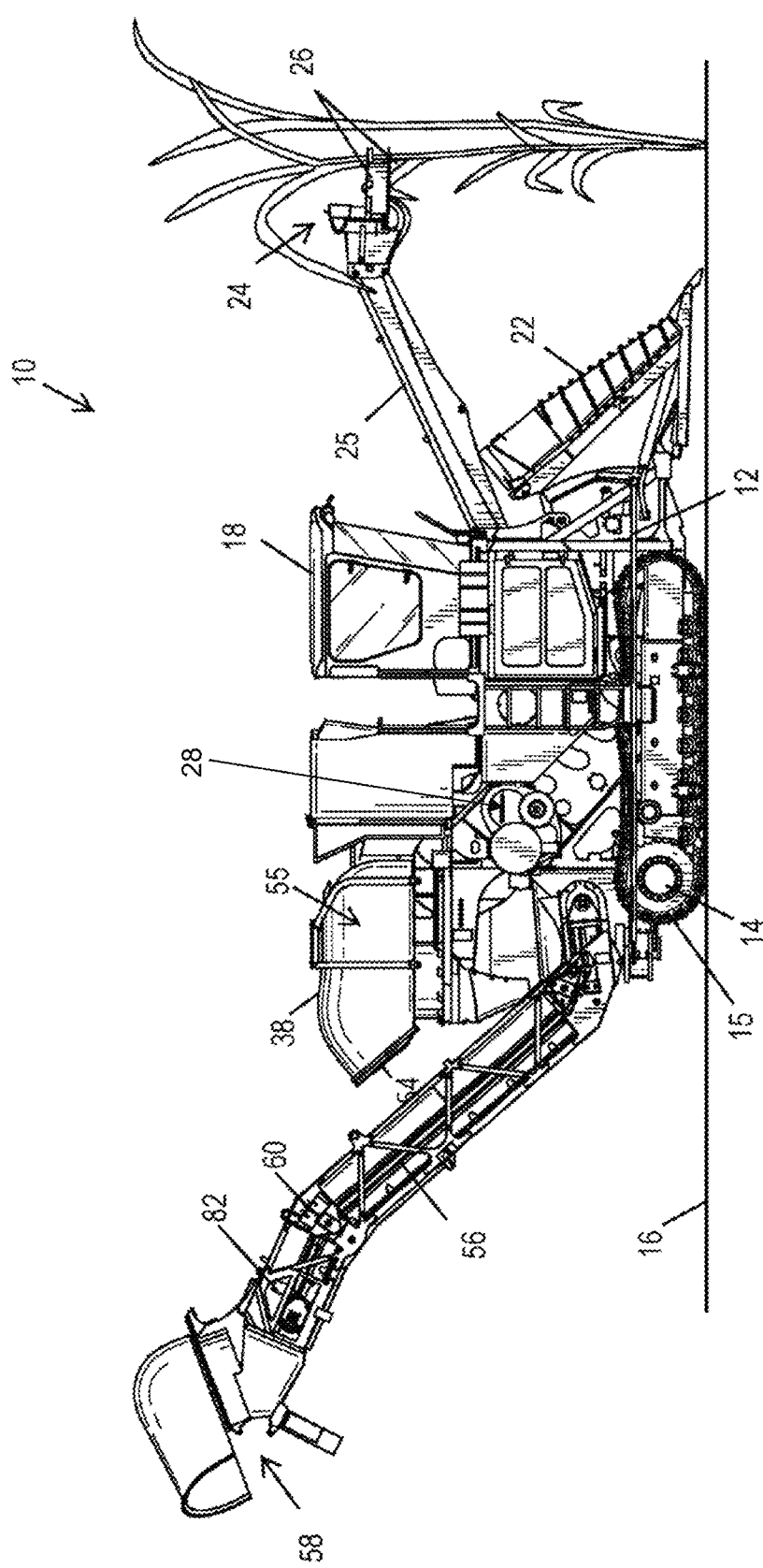
FIG. 1 is a side view of a harvester according to some example embodiments.
Figure 2:
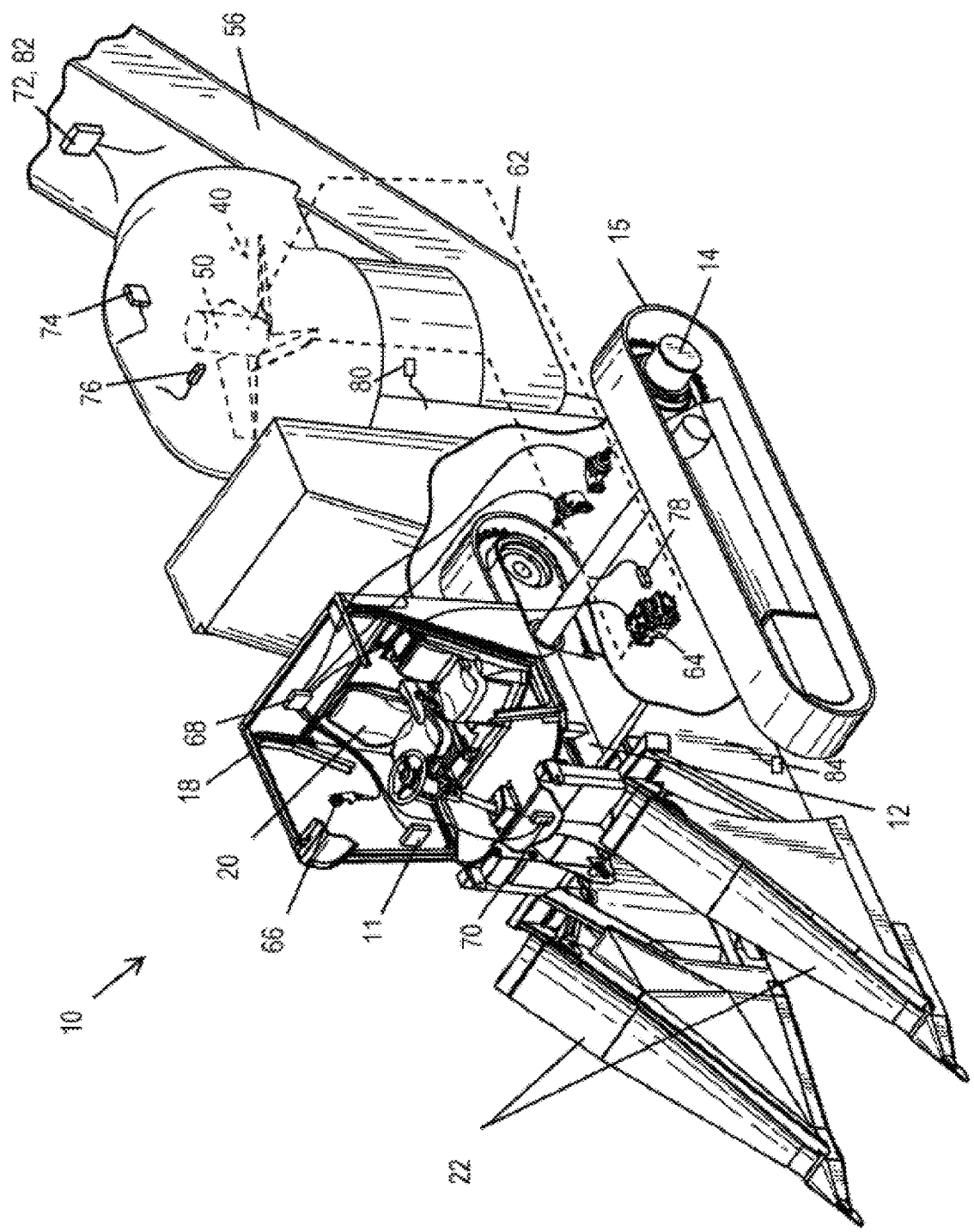
FIG. 2 is a perspective view of the harvester shown in FIG. 1 according to some example embodiments.

With reference to FIGS. 1 and 2, a harvester 10, such as a sugarcane harvester may include a prime mover (not shown), such as an internal combustion engine, for providing motive power and a throttle 11 for controlling a speed of the prime mover and thus a ground speed of the harvester 10. Further, the harvester 10 may include a frame 12 supported on wheels 14 having continuous tracks 15, tires, or other traction devices that engage a field 16. The tracks 15 may interact directly with the field 16 and be responsible for harvester 10 movement and tractive effort, although in other constructions the harvester 10 is provided only with wheels (rather than tracks as illustrated). An operator's cab 18 may be mounted on the frame 12 and contain a seat 20 for an operator. A pair of crop lifters 22 having side by side augers or scrolls may be mounted to the front of the frame 12, and operate on opposite sides of a row of crop to be harvested. The crop lifters 22 may cooperate with upper and lower knock-down rollers and a base cutter including counter-rotating discs which cut off the stalks of crop close to the field 16 after being knocked down by the rollers. The crop lifters 22 may be configured to lift the sugar cane for feeding into a feed section (not shown). Additionally, the harvester 10 may be equipped with a topper 24 extending from the frame 12 on a boom 25. The topper 24 may have a blade or blades 26 for cutting the top off a crop and allowing for easier processing of the remaining crop by the harvester 10.

Figure 3:
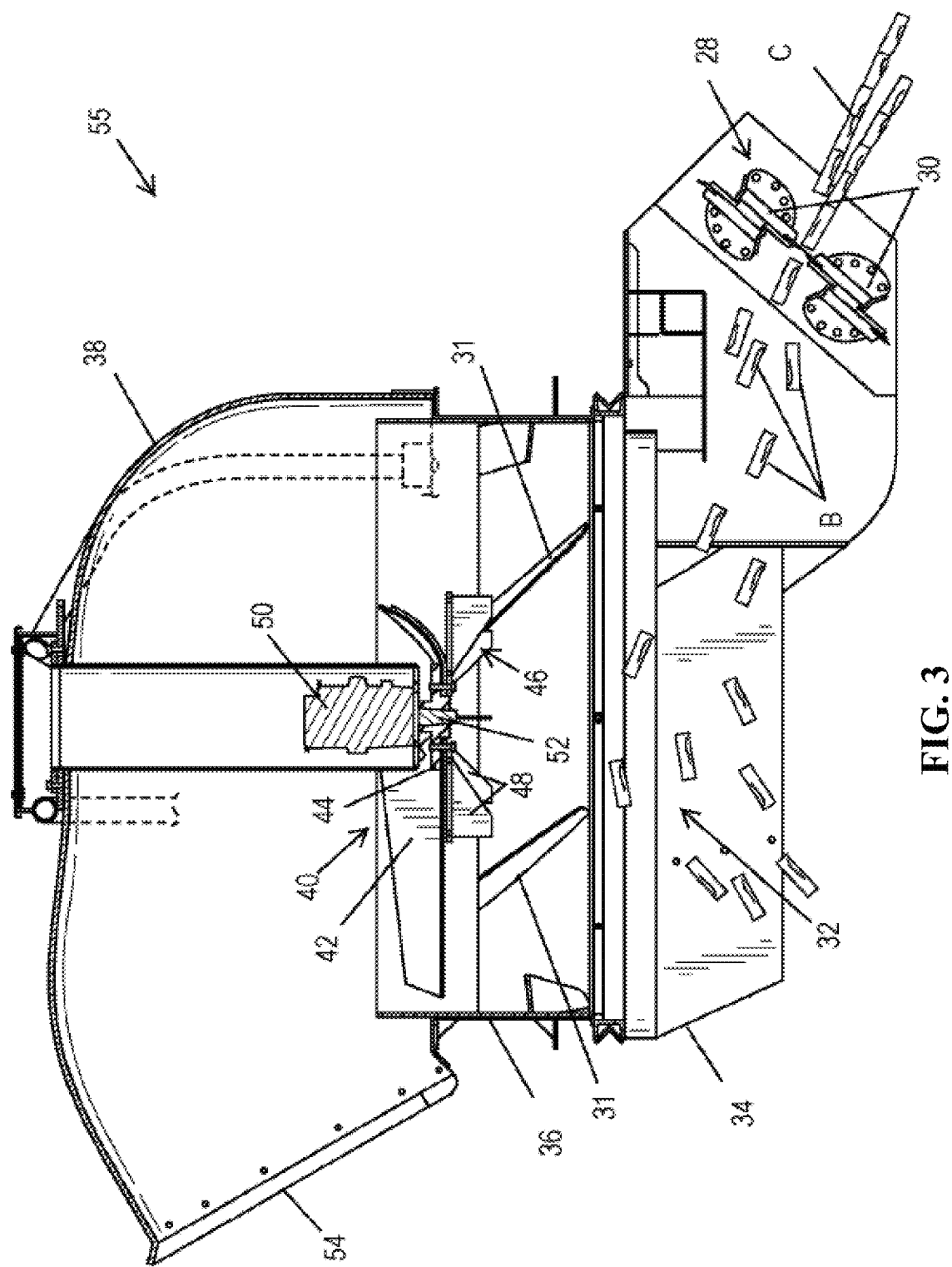
FIG. 3 illustrates a cross section through a chopper and a separator of the harvester shown in FIGS. 1-2 according to some example embodiments.

Referring to FIGS. 1 and 3 the harvester 10 may include a chopper 28 and/or a separator 55. The chopper 28 may cut the crop, and the separator 55 may receive the cut crop from the chopper 28 and generally separate the cut crop by way of a crop cleaner. The crop cleaner may include any suitable mechanism for cleaning the cut crop, such as a fan (as in the illustrated construction that will be described below), a source of compressed air, a rake, a shaker, or any other mechanism that discriminates various types of crop parts by weight, size, shape, etc., in order to separate extraneous plant matter from billets. Referring to FIGS. 1-3, the separator 55 may include any combination of one or more of a cleaning chamber 32, a cleaning chamber housing 34, a crop cleaner such as a fan 40, a fan enclosure 36, a motor 50 driving the fan 40, a hood 38 having an opening 54, and/or a centrifugal blower wheel 46.

The separator 55 may be coupled to the frame 12 and located downstream of the crop lifters 22 for receiving cut crop from the chopper 28. The chopper 28 may include counter-rotating drum cutters 30 with overlapping blades for cutting stalks of the crop, such as cane C, into billets B, which are pieces of the stalk. In other constructions, the chopper 28 may include any suitable blade or blades for cutting the stalks of crop. The crop may also include dirt, leaves, roots, and other plant matter, which will be collectively referred to herein as extraneous plant matter, which may also be cut in the chopper 28 along with the cane C. The chopper 28 may direct a stream of the cut crop (billets B and/or cut extraneous plant matter) to the cleaning chamber 32, which may be generally defined by the cleaning chamber housing 34, the fan enclosure 36, and/or the hood 38, all of which may be coupled to the frame 12 and located just downstream of the chopper 28 for receiving the cut crop from the chopper 28. The fan enclosure 36 may be coupled to the cleaning chamber housing 34 and may include deflector vanes 31.

The hood 38 may be coupled to the fan enclosure 36 and have a domed shape, or other suitable shape, and include an opening 54 angled out from the harvester 10 and facing slightly down onto the field 16. In some constructions, the opening 54 may be generally perpendicular to the drive shaft 52. The hood 38 may direct the cut crop through the opening 54 to the outside of the harvester 10, e.g., for discharging a portion of cut crop removed from the stream of cut crop back onto the field 16.

Mounted for rotation in the cleaning chamber 32 may be the fan 40. For example, the fan 40 may be in the form of an extractor fan having axial flow fan blades 42 radiating out from, and joined to, a hub 44. In the illustrated construction, the fan 40 (or other crop cleaner) may be configured to draw air and extraneous plant matter from the cleaning chamber 32. In other constructions, the fan 40 (or other crop cleaner) may be configured to blow rather than extract, e.g., to blow or push the air through the cleaning chamber 32 to clean the crop. The fan 40 may include other types of fans with other types of blades, such as a centrifugal fan, amongst others. The centrifugal blower wheel 46 may be mounted for rotation with the fan 40 radially inwardly of the deflector vanes 31. For example, a plurality of generally right-angular blower blades 48 may be fixed to the underside of the centrifugal blower wheel 46 radiating out therefrom.

The motor 50, such as a hydraulic motor, may include a drive shaft 52 operatively coupled to drive the fan 40. For example, the drive shaft 52 may be keyed to the hub 44 or operatively coupled in other suitable ways to drive the fan 40. The motor 50 may also be operatively coupled to drive the centrifugal blower wheel 46 in a similar manner. In other constructions, the motor 50 may be electric, pneumatic, or may include any other suitable type of motor, an engine, or a prime mover to drive the fan 40 and/or the centrifugal blower wheel 46.

Referring again to FIGS. 1-2, a conveyor 56 may be coupled to the frame 12 for receiving cleaned crop from the separator 55. The conveyor 56 may terminate at a discharge opening 58 (or outlet) elevated to a height suitable for discharging the cleaned crop into a collection receptacle of a vehicle (not shown), such as a truck, wagon, or the like following alongside the harvester 10. A secondary cleaner 60 may be located adjacent the discharge opening 58 for cleaning the crop a second time before being discharged to the vehicle. For example, the secondary cleaner 60 may include a fan, compressed air, a rake, a shaker, or other suitable device for cleaning the crop.

Briefly, the billets B may be generally separated from the extraneous plant matter in the cleaning chamber 32 as the fan 40 draws the generally lighter extraneous plant matter into the hood 38 and out the opening 54. All the cut crop directed through the opening 54, which is ejected back onto the field 16, may be referred to herein as residue. Residue typically includes primarily the extraneous plant matter (which has generally been cut) and may include some billets B.

The cleaning chamber housing 34 may direct the cleaned crop to the conveyor 56. The cleaned crop typically includes primarily billets B, although some extraneous plant matter may still be present in the cleaned crop. Thus, some extraneous plant matter may be discharged with the billets B from the discharge opening 58. Extraneous plant matter discharged from the discharge opening 58 to the vehicle may be referred to herein as trash.

Illustrated schematically in FIG. 2, a hydraulic circuit 62 for powering the motor 50 may be operatively coupled thereto. In other constructions, the circuit 62 may be electric, pneumatic, may comprise mechanical linkages, etc. For example, the hydraulic circuit 62 may be a closed loop hydraulic circuit, which is powered by a pump 64. The pump 64 may be driven by the prime mover (not shown) of the harvester 10 or other power source.

The harvester 10 may also include an operator interface 66 (e.g., a display, buttons, a touch screen, a graphical user interface, any combination thereof, or the like) with which a user may input settings, preferences, commands, etc. to control the harvester 10. The operator interface may be operatively coupled with a control unit 68, such as a microprocessor-based electronic control unit or the like, for receiving signals from the operator interface 66 and from several sensors and for sending signals to control various components of the harvester 10 (examples of which will be described in greater detail below). Signals, as used herein, may include electronic signals (e.g., by circuit or wire), wireless signals (e.g., by satellite, internet, mobile telecommunications technology, a frequency, a wavelength, Bluetooth®), or the like. The control unit 68 may include a memory and programming, such as algorithms. The harvester 10 may also include a global positioning system ("GPS") receiver 70 operatively connected to send signals to the control unit 68. The aforementioned sensors may include a yield monitoring sensor 72, a billet loss sensor 74, a fan speed sensor 76, a load sensor 78, a moisture sensor 80, an imaging sensor 82, and/or a ground speed sensor 84. The control unit 68 may be programmed to include a monitoring system that monitors harvester functions, switch states, ground speed, and/or system pressures.

According to some example embodiments, operations described herein as being performed by the harvester 10 and/or the control unit 68 may be performed by processing circuitry. The term 'processing circuitry,' as used in the present disclosure, may refer to, for example, hardware including logic circuits; a hardware/software combination such as a processor executing software; or a combination thereof. For example, the hardware more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The control unit 68 may also have other inputs, such as an elevator speed sensor (not shown) for detecting a speed of the conveyor 56, a chopper speed sensor (not shown) for detecting a speed of the counter-rotating drum cutters 30 or other type of chopper 28, and/or a base cutter speed sensor (not shown) for detecting a speed of the counter-rotating discs, or other cutting device, of the base cutter. The control unit 68 may also have other outputs, such as for controlling the fan pump 64, the fan motor 50, a pump, valve, or motor (not shown) of the centrifugal blower wheel 46, the speed of the chopper 28, the height, direction, speed, and input control of the base cutter (not shown), the secondary cleaner 60, and/or the height and input control of the topper.

The yield monitoring sensor 72 may be coupled to the conveyor 56 and send a crop yield signal to the control unit 68 corresponding to an amount (e.g., a mass or a volume) of crop being discharged from the discharge opening 58.

The billet loss sensor 74 may include one or more accelerometers and/or any sensor that measures displacement or strain, or the like. The billet loss sensor 74 may be associated with the separator 55, or more specifically coupled to the separator 55. For example, the billet loss sensor 74 may be associated with, or coupled to, the cleaning chamber housing 34, the fan enclosure 36, the hood 38, the fan 40, the fan blades 42, the hub 44, the centrifugal blower wheel 46, the right angular blower blades 48, the drive shaft 52, etc., or any of the associated structures. The billet loss sensor 74 may be configured for sending a signal to the control unit 68 corresponding to each billet B passing through the separator 55 and, more specifically, out the opening 54. For example, the billet loss sensor 74 may include an accelerometer that detects the impact of a billet B hitting the fan 40 and/or a housing part, such as the hood 38. In other constructions, the billet loss sensor 74 may include a piezoelectric sensor or employ another suitable sensing technology. The billet loss sensor 74 may send a signal to the control unit 68 each time a billet is detected. The control unit 68 may record and count the billets, and may associate the billet signal data with a time, a location (e.g., from the GPS 70), etc.

The fan speed sensor 76 may be associated with, or coupled to, the fan 40, and more specifically may be coupled to, for example, the blades 42, the hub 44, the drive shaft 52, etc., or to any suitable location adjacent the fan 40. For example, the fan sensor 76 may include magnets, proximity sensors, Hall Effect sensors, etc., to count revolutions of the blades 42, the drive shaft 52, or other part of the fan 40 and send signals to the control unit 68 corresponding to, and used to determine, the fan speed. The fan sensor 76 may also include other suitable sensing technologies for determining fan speed.

The moisture sensor 80 may be positioned to detect moisture of the crop. The moisture sensor 80 may include a near infrared sensor or other suitable moisture-detecting technologies. For example, the moisture sensor 80 is disposed on the harvester 10 and may be positioned in the chopper 28, in the separator 55, and/or in the conveyor 56 and, more specifically, in any of the components of the harvester 10 associated therewith as described above. In the illustrated construction, the moisture sensor 80 may be disposed in the separator 55 and, more specifically, in the hood 38. The moisture sensor 80 may send a signal to the control unit 68 corresponding to a level of moisture in the crop.

Referring to FIGS. 1-2, the imaging sensor 82 may include vision technology disposed proximate the conveyor 56 and/or the discharge opening 58 and sending an imaging signal to the control unit 68. According to some example embodiments, the imaging sensor 82 may be a three-dimensional or stereo style camera able to output three-dimensional representations. According to some example embodiments, the imaging sensor 82 may include LIDAR, structured light, stereo vision, RADAR, etc. The imaging signal may include images of the billet B on the conveyor 56 and/or being discharged from the discharge opening. The imaging signal may also include images of trash being discharged from the discharge opening 58. The imaging sensor 82 (in combination with the control unit 68) may quantify the amount of trash as an absolute amount or as a percentage of total yield through the discharge opening 58. The imaging sensor 82 may be disposed in the conveyor 56.

Referring back to FIG. 2, the ground speed sensor 84, which may include a speedometer, a radar sensor, a velocimeter such as a laser surface velocimeter, a wheel sensor, or any other suitable technology for sensing vehicle speed, may be configured to send a ground speed signal to the control unit 68 corresponding to the speed of the harvester 10 with respect to the field 16. The ground speed signal may also be sent by the GPS 70.

The load sensor 78 may sense a load on the separator 55. For example, the load sensor 78 may measure a load on the motor 50 and may include any suitable type of sensor for the type of motor employed, e.g., electric, pneumatic, hydraulic, etc. In some constructions, the load sensor 78 may include a strain gage(s) for measuring a torque load or an amp meter for measuring an electrical load. The load on the motor 50 may also be measured indirectly, such as by measuring a load on the fan 40 and/or the centrifugal blower wheel 46. In some constructions, such as the illustrated construction employing a hydraulic motor 50, the load sensor 78 may include a pressure transducer, or other pressure sensing technology, in communication with the hydraulic circuit 62 for measuring pressure within the circuit 62. For example, the load sensor 78 may be coupled to the fan motor 50 or to the pump 64, or anywhere along the circuit 62 to measure the associated pressure in the circuit 62. The load sensor 78 may send load signals to the control unit 68.

When the blades of the chopper 28 become worn through use, the cutting performance of the blades decreases. Such worn blades fail to separate the crops into billets of desired/selected length (e.g., eject billets of excessive length), fail to provide cleanly cut billets, etc. For example, in a sugarcane harvester, the main cutter blades are designed to make several clear and straight cuts such that each stalk is cut into billets approximately 6-8 inches in length. When these blades become worn, they will fail to make clean cuts—sometimes even allowing entire stalks to pass through into the unloading elevator. A similar set of blades strips the leafy material away from the stalk so that the primary extractor fan may blow this leafy material away before the material reaches the elevator. Accordingly, proper maintenance of the blades includes sharpening the blades when they become worn.

Conventionally, a current wear level of the blades of the chopper 28 is determined by visually inspecting the blades. However, the operation of the chopper 28 is halted to permit safe visual inspection of the blades. Accordingly, a tradeoff exists between sufficient monitoring of the blades, to allow for sufficient cutting performance, and avoiding stoppages of the harvester.

However, according to some example embodiments, improved devices and methods are provided for blade wear monitoring. For example, the imaging sensor 82 may capture images of the billets B on the conveyor 56, and the control unit 68 may determine a wear level of the blades of the chopper 28 based on the captured images. Accordingly, the wear level of the blades is determined without halting operations of the harvester 10. Thus, the improved devices and methods provide monitoring of the blades while avoiding stoppages of the harvester, thereby increasing the processing speed of the harvester 10 while improving the quality of the resulting billets B.

Figure 4:
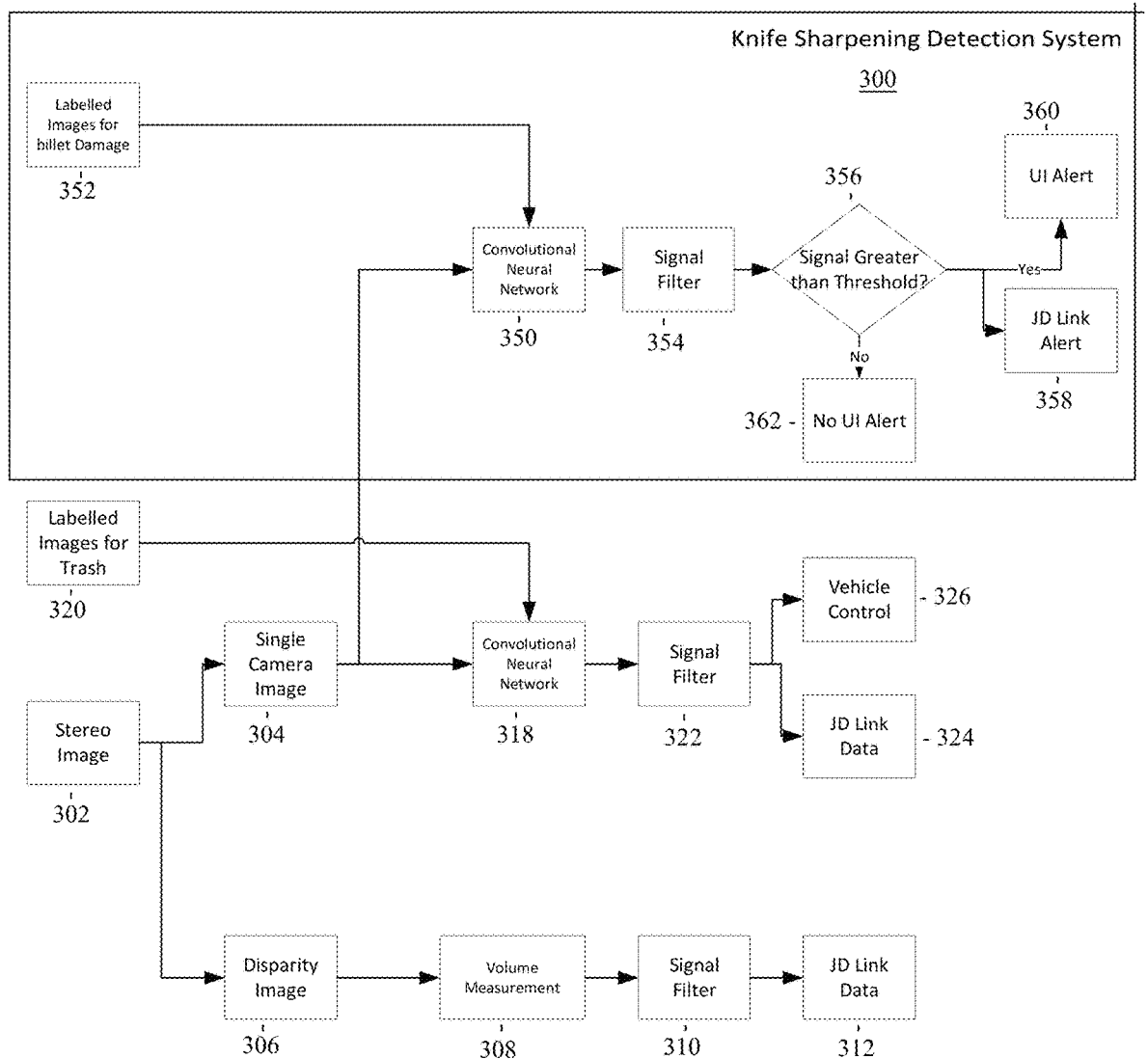
FIG. 4 is a knife sharpening detection system according to some example embodiments.

Referring to FIG. 4, according to some example embodiments, the imaging sensor 82 may output a stereo image 302 including a single camera image 304 and a disparity image 306. The control unit 68 may determine a volume of trash, billets B, etc. based on the disparity image 306 (operation 308). The control unit 68 may output the determined volume to a telematics service (operation 312). According to some example embodiments, the control unit 68 may perform post-processing (e.g., filtering, etc.) on data corresponding to the determined volume before outputting the data to the telematics service (operation 310). According to some example embodiments, the telematics service may be the JDLink™ Machine Monitoring System. The JDLink™ Machine Monitoring System is an example of an agricultural vehicle telematics service, which is available from John Deere & Company. As another example, OnStar® is a telematics service available from the General Motors Corporation. JDLink™ and OnStar® are examples of subscription telematics services that are provided to customers for a price.

The control unit 68 may input the single camera image 304 into a trash detection machine learning model (MLM) 318. The trash detection MLM 318 may be trained to output an amount of trash (e.g., as an absolute amount, percentage of total yield, etc.) based on an input image. The trash detection MLM 318 may be trained using a set of labelled images of trash 320 (e.g., trash on the conveyor 56). The control unit 68 may output the amount of trash to a telematics service (operation 324). According to some example embodiments, the control unit 68 may perform post-processing (e.g., filtering, etc.) on data corresponding to the amount of trash before outputting the data to the telematics service (operation 322). According to some example embodiments, the telematics service may be the JDLink™ Machine Monitoring System. The control unit 68 may also control the harvester 10 based on the amount of trash (e.g., by controlling the speed of the harvester 10, the speed of the fan 40, etc.) (operation 326).

FIG. 4 also illustrates operations performed by a blade (e.g., a knife) sharpening detection system 300. For example, the blade sharpening detection system 300 may include the control unit 68 and/or a blade wear detection MLM 350. The control unit 68 may input the single camera image 304 into the blade wear detection MLM 350. The blade wear detection MLM 350 may be trained to output blade wear level (e.g., as an absolute amount, percentage of wear, etc.) based on an input image. The blade wear detection MLM 350 may be trained using a set of labelled images for billet damage 352 (e.g., cuts of billets on the conveyor 56). According to some example embodiments, the control unit 68 may perform post-processing (e.g., filtering, etc.) on data corresponding to the blade wear level (operation 354). For example, a filter (e.g., an integral function) that provides a moving average may be applied to the data corresponding to the blade wear level to smooth the data. Such a filter may adjust for varying amounts of billets included in different images among the set of labeled images 352.

The control unit 68 may determine whether a signal (e.g., a first signal) output by the blade wear detection MLM 350 (e.g., a first signal indicative of the wear level of a blade of the chopper 28) is greater than a threshold (operation 356). According to some example embodiments, the threshold may be set by an operator of the harvester 10. According to some example embodiments, the threshold may be a design parameter determined through empirical study. In response to determining the first signal is greater than the threshold, the control unit 68 may output a signal (e.g., a second signal) to a user interface (e.g., a terminal device of the operator, the operator interface 66, etc.) (operation 360) and/or a telematics service (e.g., the JDLink™ Machine Monitoring System) (operation 358). The second signal may be an alert indicating that the blade of the chopper 28 has become worn and should be sharpened. According to some example embodiments, the second signal indicates the wear level of the blade. In response to determining the first signal is equal to or less than the threshold, the control unit 68 may not output the second signal (operation 362). While some example embodiments are described where an alert is output when a signal (e.g., a signal level) is greater than a threshold, it should be understood that some example embodiments are not limited thereto. For example the alert may be output when the signal is greater than or equal to the threshold.

According to some example embodiments each of the trash detection MLM 318 and the blade wear detection MLM 350 may be implemented using a convolutional neural network (CNN). For example, the CNN may be an artificial neural network containing a spatially invariant, and/or recurrent, convolutional layer. In some example embodiments, the processing circuitry may perform some operations (e.g., the operations described herein as being performed by the trash detection MLM 318 and/or the blade wear detection MLM 350) by artificial intelligence and/or machine learning. As an example, the processing circuitry may implement an artificial neural network that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as CNNs, recurrent neural networks (RNNs) optionally including long short-term memory (LSTM) units and/or gated recurrent units (GRUs), stacking-based deep neural networks (S-DNNs), state-space dynamic neural networks (S-SDNNs), deconvolution networks, deep belief networks (DBNs), and/or restricted Boltzmann machines (RBMs). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Figure 5:
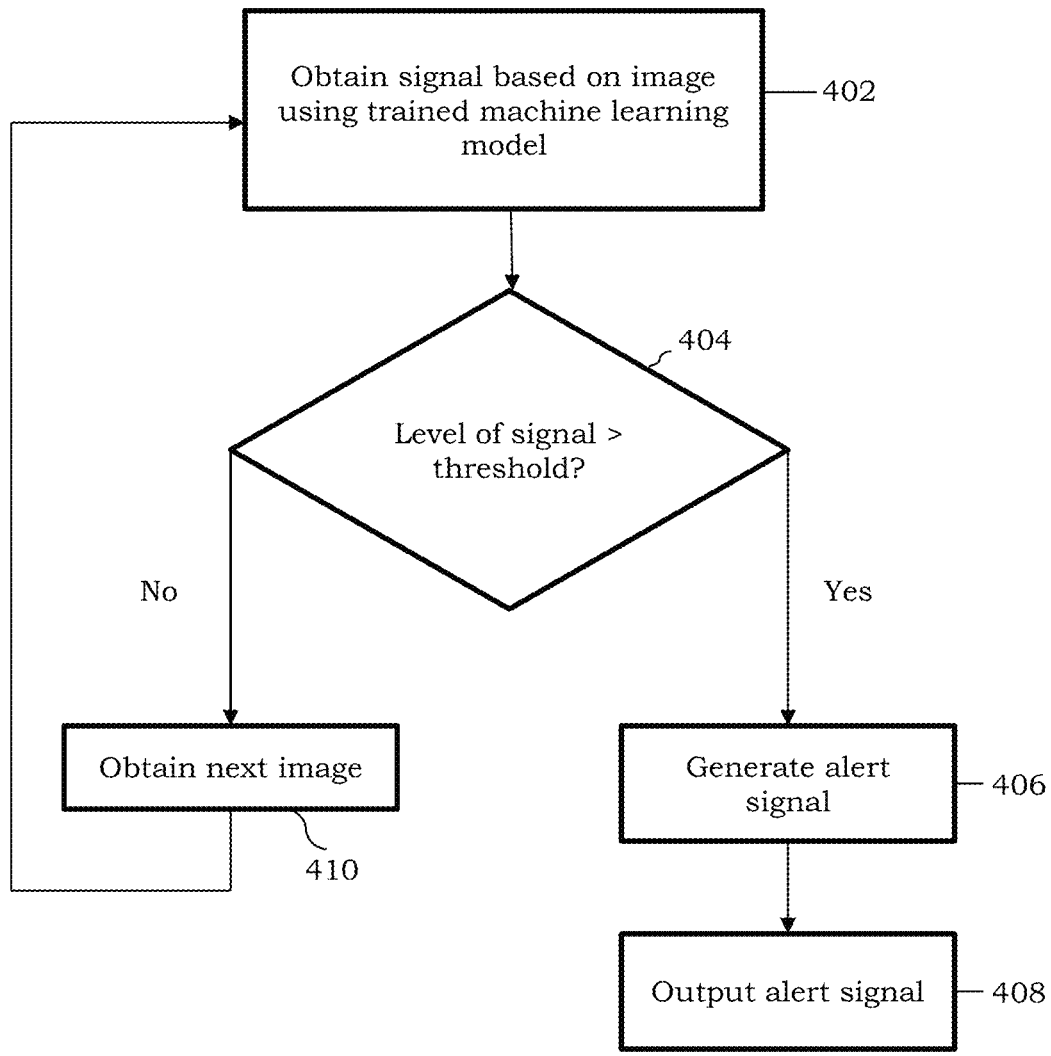
FIG. 5 is a method for blade wear monitoring according to some example embodiments.

FIG. 5 depicts a method for blade wear monitoring according to some example embodiments. According to some example embodiments, the control unit 68 may perform the method illustrated in FIG. 5. In operation 402, the method may include obtaining a signal from the blade wear detection MLM 350 based on an image input to the blade wear detection MLM 350. For example, the image may be a recently captured image of the conveyor 56, and depict the billets B obtained by cutting the crop C using the blade of the chopper 28. In operation 404, the method may include determining whether the signal is greater than the threshold. In response to determining the signal is greater than the threshold ("Yes" in operation 404), the method may include generating the alert signal in operation 406 and outputting the alert signal (e.g., to the user interface and/or telematics service) in operation 408. In response to determining the signal is less than or equal to the threshold ("No" in operation 404), the method may include obtaining a next image in operation 410 and returning to operation 402 in which a next signal is obtained from the blade wear detection MLM 350 based on the next image input to the blade wear detection MLM 350.

According to the method illustrated in FIG. 5, the wear level of the blade of the chopper 28 may be monitored during operation of the harvester 10, and an alert output in response to determining the wear level of the blade has exceeded a threshold wear level. According to some example embodiments, the images of the conveyor 56 may be captured, and the illustrated method performed, in real-time to permit detection of worn blades. In some example embodiments, the images of the conveyor 56 may be captured, and the illustrated method performed, periodically to conserve resources (e.g., power, processor, memory, etc.).

Figure 6:
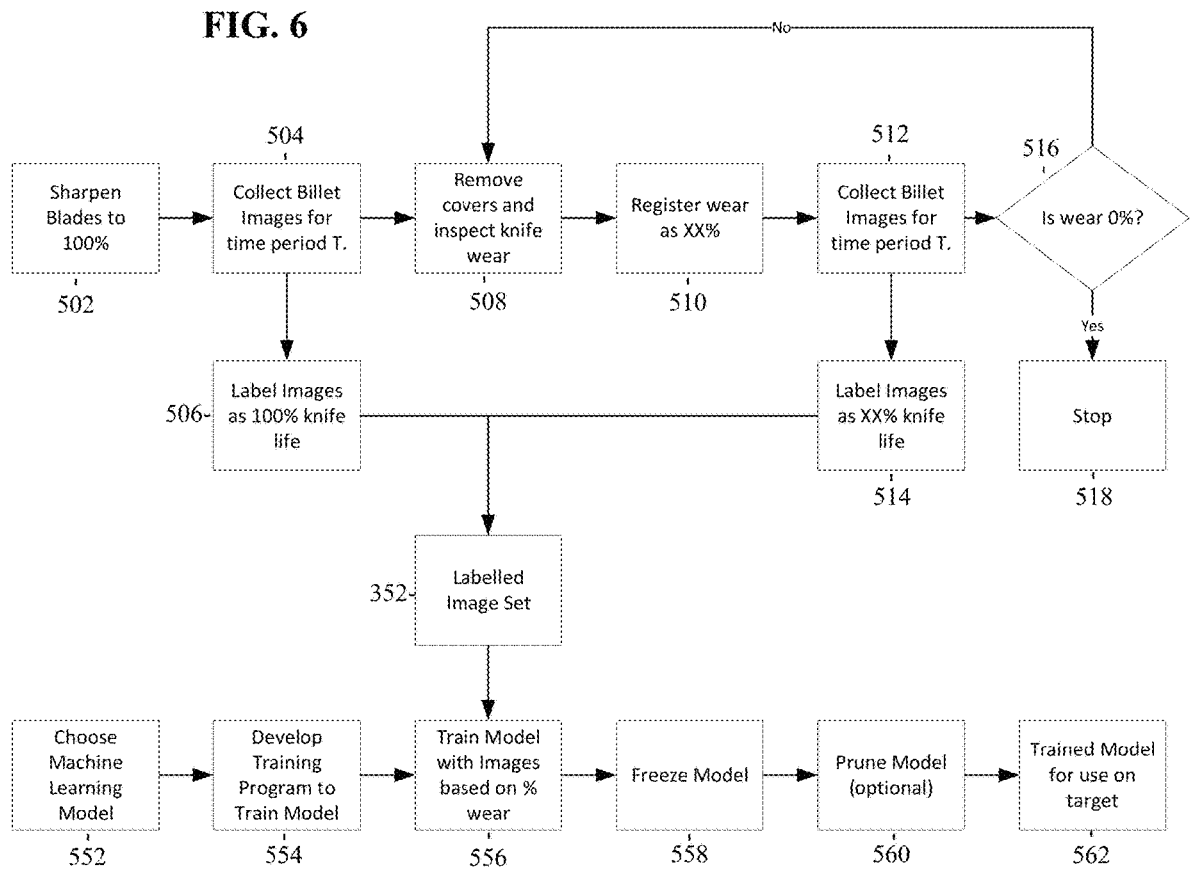
FIG. 6 is a method for training a machine learning model based on inspection of blade wear according to some example embodiments.

Referring to FIG. 6, depicted is a method for training a machine learning model based on expert inspection of blade wear according to some example embodiments. For example, the method illustrated in FIG. 6 may be used to obtain the set of labelled images for billet damage 352 (also referred to herein as the labeled image set 352) discussed in association with FIG. 4. As used herein, wear level of a blade may also be discussed with reference to a lack of wear, e.g., a sharpness of the blade.

In operation 502, a blade of the chopper 28 may be sharpened to a highest degree of sharpness (may also be referred to herein as 100% sharp or 0% worn). In operation 504, first images of billets map be captured (e.g., images of the billets B captured using the imaging sensor 82). According to some example embodiments, the first images of the billets may be captured for a time period T. In operation 506, the first images may be labeled as 100% sharp (e.g., 100% knife life). In operation 508, an operator may remove a cover of the chopper 28 and inspect the wear of the blades. In operation 510, the operator may to determine a wear level (e.g., a percentage of knife life or wear) based on the inspection performed in operation 508, and may register (e.g., record, store, etc.) the determined wear level. According to some example embodiments, the operator may be an expert in determining blade sharpness, and/or may use a sensor, tool, etc., to aid in determining blade sharpness. For example, the operator may determine the blade sharpness based on billet characteristics such as: (a) uniformity or variation in billet length, e.g., variance or standard deviation of billet cut length versus harvested quantity (e.g., by weight or volume) for a sampling interval of harvested material on the elevator (e.g., the conveyor 56) in real-time; (b) shape of billet cut end, such as crisp right angle to the stalk axis or deviation from a right angle during a sampling interval; (c) rectilinear or straightness of one or both billet cut end(s) of each billet (or presence of jagged or irregular cut, or uncut hang-nail fibers of stalk at or near the cut ends); and/or (d) figure, merit or uniformity of the cut ends of the billet to estimate billet cut quality.

In operation 512, second images of the billets may be captured for the time period T. According to some example embodiments, the first images and second images may be captured over the same time period T, similar time periods T or different time periods T. In operation 514, the second images may be labeled according to the wear level determined by the operator (e.g. as determined in operation 510). In operation 516, a determination is made whether the wear level has reached a lowest degree of sharpness (may also be referred to herein as 0% sharp or 100% worn). If it is determined that the wear level is not 0% sharp ("No" in operation 516), operations 508-516 may be repeated. Otherwise, if it is determined that the wear level is 0% sharp ("Yes" in operation 516), the image collection process may be stopped (operation 518), and the labeled image set 352 may be provided for use in training the blade wear detection MLM 350. According to some example embodiments, the labeled image set may include the first images of the billets (e.g., the images collected in operation 504) and the second images of the billets (e.g., the images collected in operation 512). For example, the second images of the billets may include a plurality of sets of images, each set of images corresponding to an iteration in which operations 508-516 are performed (or repeated).

According to some example embodiments, operations 504 and 512 may be performed using the imaging sensor 82, and operations 502, 506, 508, 510, 514 and/or 516 may be performed by the operator (e.g., with the aid of a tool, a sensor, processing circuitry, etc.). According to some example embodiments, instead of removing the cover of the chopper 28 and directly inspecting the wear of the blades in operation 508, the operator may inspect the billets in the images without removing the cover or directly inspecting the wear of the blades. For example, the operator may be an expert in detecting a wear level of the blades based on visual inspection of the cuts of the billets (e.g., billet length, sharpness of the cuts, etc.). According to some example embodiments, in operation 508, the operator may determine a wear level (e.g., a percentage of knife life or wear) of the blades based on this visual inspection of the cuts of the billets (e.g., by reviewing collected billet images or by directly monitoring the billets on the conveyor 56). According to some example embodiments, in addition to visually inspecting the cutes of the billets, the operator may determine the wear level based on visual inspection of the trash.

In operation 552, the blade wear detection MLM 350 may be selected and/or initialized (e.g., using processing circuitry). In operation 554, a training program may be developed, loaded from a memory and/or downloaded via a communication link (e.g., using the processing circuitry). In operation 556, the blade wear detection MLM 350 may be trained using the labeled image set 352. For example, the individual images from the labeled image set 352 may be sequentially input to the blade wear detection MLM 350 (e.g., using the processing circuitry). The blade wear detection MLM 350 may output a blade wear signal based on each input image. The blade wear signal may provide an indication of a blade wear level. The blade wear signal output based on each respective input image may be compared to the wear level indicated by the label of the respective input image (e.g., using the processing circuitry). Feedback may be provided to the blade wear detection MLM 350 based on an amount difference between the output blade wear signal and the label (e.g., using the processing circuitry). The blade wear detection MLM 350 may be adjusted based on the feedback. Accordingly, the image labels may be used as a ground truth for iteratively adjusting the blade wear detection MLM 350 to more accurately output a blade wear signal consistent with the labels.

In operation 558, the trained blade wear detection MLM 350 may be frozen. For example, once the blade wear detection MLM 350 has been successfully trained to output a blade wear signal consistent with the image labels (e.g., within a particular degree of error among a particular number of images), training is ended and the trained blade wear detection MLM 350 is frozen. In operation 560, the trained blade wear detection MLM 350 may be pruned. According to some example embodiments, the trained blade wear detection MLM 350 may be pruned to remove elements corresponding to the smallest weights (e.g., close to zero). According to some example embodiments, the trained blade wear detection MLM 350 may be pruned by training a larger, more computationally-intensive, network and using this larger network to train a smaller network (e.g., the trained blade wear detection MLM 350) in a teacher-student type of framework. In operation 562, the trained blade wear detection MLM 350 may be deployed for use in detecting a blade wear level based on input images of billets (e.g., as discussed in connection with the methods depicted in FIGS. 4-5).

According to some example embodiments, the processing circuitry used to perform operations 552, 554, 556, 558, 560 and/or 562 may be included in the harvester 10 (e.g., the control unit 68). According to some example embodiments, the processing circuitry used to perform operations 552, 554, 556, 558, 560 and/or 562 may be included in a device external to the harvester 10 as discussed in association with FIG. 10.

Figure 7:
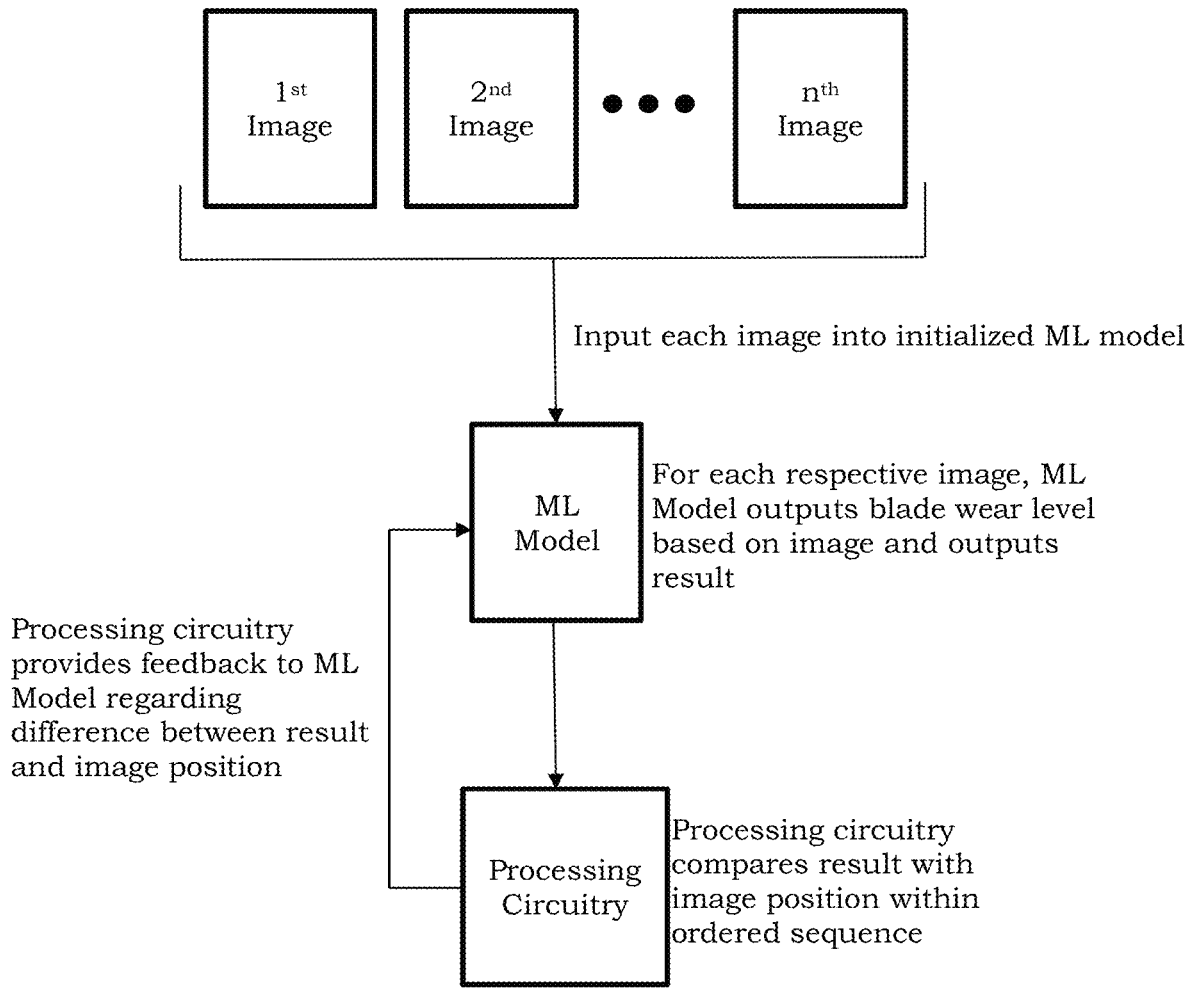
FIG. 7 is a method for training a machine learning model based on an ordered set of images according to some example embodiments.

FIG. 7 depicts a method for training a machine learning model based on an ordered set of images according to some example embodiments. According to some example embodiments, the method illustrated in FIG. 7 may be performed using processing circuitry included in the harvester 10 (e.g., the control unit 68) and/or in a device external to the harvester 10 as discussed in association with FIG. 10.

In operation 602, the method may include obtaining an ordered set of images (e.g., reference images 1-n, where n is a natural number equal to or greater than 3) of billets (e.g., the billets B) on a conveyor (e.g., the conveyor 56). For example, before the images are captured by an imaging sensor (e.g., the imaging sensor 82), a blade of a chopper (e.g., the chopper 28) may be sharpened to a highest degree of sharpness. The sharpened blade may then be used to separate a crop (e.g., sugar cane) into billets. While the blade is in use, the imaging sensor may periodically capture images of the resulting billets and label each respective image with a sequence number corresponding to an order in which the respective image was captured. The use of the blade and the capturing of the images may continue for a period of time or until the blade is worn to a lowest degree of sharpness. The captured images may constitute the ordered set of images and may be provided for use in training the blade wear detection MLM 350.

In operation 604, each individual image in the ordered set of images may be may be sequentially input to the blade wear detection MLM 350 (e.g., the "ML Model"). In operation 606, the blade wear detection MLM 350 may output a blade wear signal based on each input image. The blade wear signal may provide an indication of a blade wear level. In operation 608, the blade wear signal output based on each respective input image may be compared to the sequence number of the respective input image. For example, the blade wear signal may be compared to a position of the sequence number of the respective input image among the ordered set of images (e.g., a percentage of the ordered set of images sequentially input into the blade wear detection MLM 350 through the respective input image, a ratio of the sequence number of the respective input image to the quantity of the ordered set of images, etc.). In operation 610, feedback may be provided to the blade wear detection MLM 350 based on an amount difference between the output blade wear signal and the position of the sequence number. For example, the sequence number may be used as an indication of wear level. The blade wear detection MLM 350 may be adjusted based on the feedback. Accordingly, the sequence numbers of the ordered set of images may be used as a ground truth for iteratively adjusting the blade wear detection MLM 350 to more accurately output a blade wear signal consistent with the sequence numbers.

Operations 604, 606, 608 and 610 may be iteratively repeated until the blade wear detection MLM 350 has been successfully trained to output a blade wear signal consistent with the image labels (e.g., within a particular degree of error among a particular number of images). The trained blade wear detection MLM 350 may be deployed for use in detecting a blade wear level based on input images of billets (e.g., as discussed in connection with the methods depicted in FIGS. 4-5.

Figure 8:
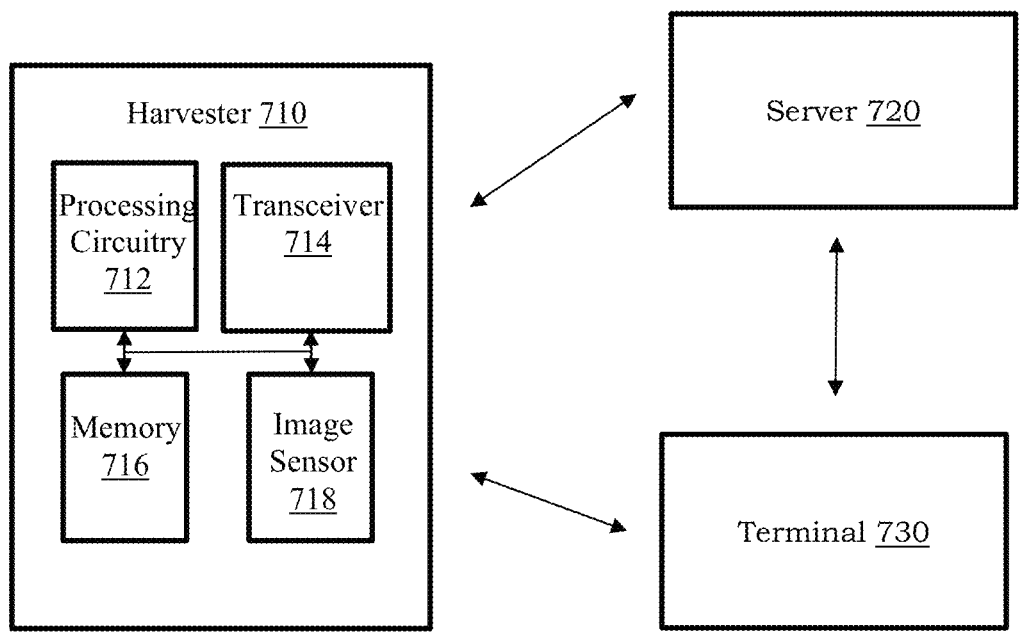
FIG. 8 is a diagram of a system for blade wear monitoring according to some example embodiments.

FIG. 8 is a diagram of a system for blade wear monitoring according to some example embodiments. The system may include a harvester 710 (e.g., the harvester 10), a server 720 and/or a terminal 730. The harvester 10 may include processing circuitry 712 (e.g., the control unit 68), a transceiver 714, a memory 716 (e.g., the memory of the control unit 68) and/or an imaging sensor 718 (e.g., the imaging sensor 82). The harvester 10 is connected to the server 720 and/or the terminal 730 via a first communication link. According to some example embodiments, the harvester 710 may transmit an alert signal (see, e.g., operation 408 depicted in FIG. 5) to the server 720 in response to determining a wear level signal exceeds a threshold. According to some example embodiments, operations described herein as being performed by the harvester 710, the server 720 and/or the terminal 730 may be performed by processing circuitry. According to some example embodiments, the memory 716, and/or a memory of the server 720, may be a tangible, non-transitory computer-readable medium, such as a Random Access Memory (RAM), a flash memory, a Read Only Memory (ROM), an Electrically Programmable ROM (EPROM), an Electrically Erasable Programmable ROM (EEPROM), registers, a hard disk, a removable disk, a Compact Disk (CD) ROM, any combination thereof, or any other form of storage medium known in the art.

According to some example embodiments, the server 720 may be a base station. The base station may generally refer to a fixed station that communicates with user equipment and/or other base stations, and may exchange data and control information by communicating with user equipment and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range.

According to some example embodiments, the terminal 730 may be fixed or mobile and may refer to any device that may communicate with a base station, such as the server 720, to transmit and receive data and/or control information. For example, the terminal 730 may be referred to as a terminal, a terminal equipment, a mobile station (MS), a mobile terminal (MT), a user terminal (UT), a subscriber station (SS), a wireless device, a handheld device, or the like.

According to some example embodiments in which the blade wear detection MLM 350 is trained using processing circuitry included in a device external to the harvester 10 (with reference to FIGS. 6 and 7), the device (as discussed in association with FIG. 10) may be implemented using the same components as, or similar components to, those of harvester 710 illustrated in FIG. 8.

According to some example embodiments, the server 720 is a communication server. According to some example embodiments, the server 720 may be a telematics communication server (e.g., may be used in the JDLink™ Machine Monitoring System). The server 720 may provide the alert signal to an operator via the terminal 730, the operator interface 66, etc. For example, the server 720 may transmit the alert signal to the operator via a second communication link.

According to some example embodiments, each of the first communication link and second communication link may be a wired link and/or a wireless link. For example, each of the first communication link and second communication link may be an Ethernet link, an 802.11 (WiFi) link, a Radio Frequency (RF) (e.g., cellular) link, a Transmission Control Protocol/Internet Protocol (TCP/IP) link, a Universal Serial Bus (USB) link, a Bluetooth™ link, or any combination thereof.

According to some example embodiments, the operator may input one or more thresholds of blade wear for use in generating corresponding alerts. For example, the operator may input the one or more thresholds into the terminal 730, the operator interface 66, etc. In the event the operator inputs the one or more thresholds into the terminal 730, the terminal 730 may transmit the one or more thresholds to the server 720 via the second communication link, and the server 720 may transmit the one or more thresholds to the harvester 710 (e.g., received via the transceiver 714) via the first communication link.

According to some example embodiments, the operator may input a respective alert type in correspondence with each of the one or more thresholds of blade wear. For example, the alert types may include text message, email, indication on the operator interface 66, indication on the terminal 730 and/or a particular message to be conveyed by the alert signal. The corresponding alert types may be provided to the server 720 and/or the harvester 710 along with the one or more thresholds.

Referring to FIG. 9, according to some example embodiments, the processing circuitry 712 may generate a table of wear level alerts 800 in which each respective threshold received from the operator (e.g., threshold 1, threshold 2 . . . threshold m) is stored in association with a respective alert type (e.g., alert 1, alert 2 . . . alert m). 'm' may be a natural number equal to or greater than 3. Each of the respective alert types may be the same as, similar to or different from the others. The table of wear level alerts 800 may be stored in the memory 716. According to some example embodiments, in operation 404 of FIG. 5, the processing circuitry 712 may refer to the table of wear level alerts 800 and determine whether the signal is greater than each of the thresholds. In operation 406 of FIG. 5, the processing circuitry 712 may generate the alert signal of the alert signal type corresponding to the threshold exceeded with reference to the table of wear level alerts 800. According to some example embodiments, the generating the alert signal may include generating an email, text message, etc., based on the alert signal type. According to some example embodiments, the thresholds and alert types included in the table of wear level alerts 800 may be set by a manufacturer and/or may not be modifiable by the operator.

According to some example embodiments, the server 720 may generate and/or store the table of wear level alerts 800. In operation 404 of FIG. 5, the processing circuitry 712 may determine whether the signal is greater than each of the thresholds with reference to the table of wear level alerts 800 stored on the server 720.

According to some example embodiments, in operation 408 of FIG. 5, the processing circuitry 712 may output the alert signal to the operator directly (e.g., via the operator interface 66, a Bluetooth™ signal, etc.) or via the server 720.

According to some example embodiments, the alert signal type may include a control operation of the harvester 710. For example, the generated alert signal may cause the processing circuitry 712 (e.g., the control unit 68) to decrease the ground speed of the harvester 710, increase the rotational speed of the blades of the chopper 28 (e.g., a rotational speed of the counter-rotating drum cutters 30), etc., in response to determining the corresponding threshold is exceeded.

Figure 10:
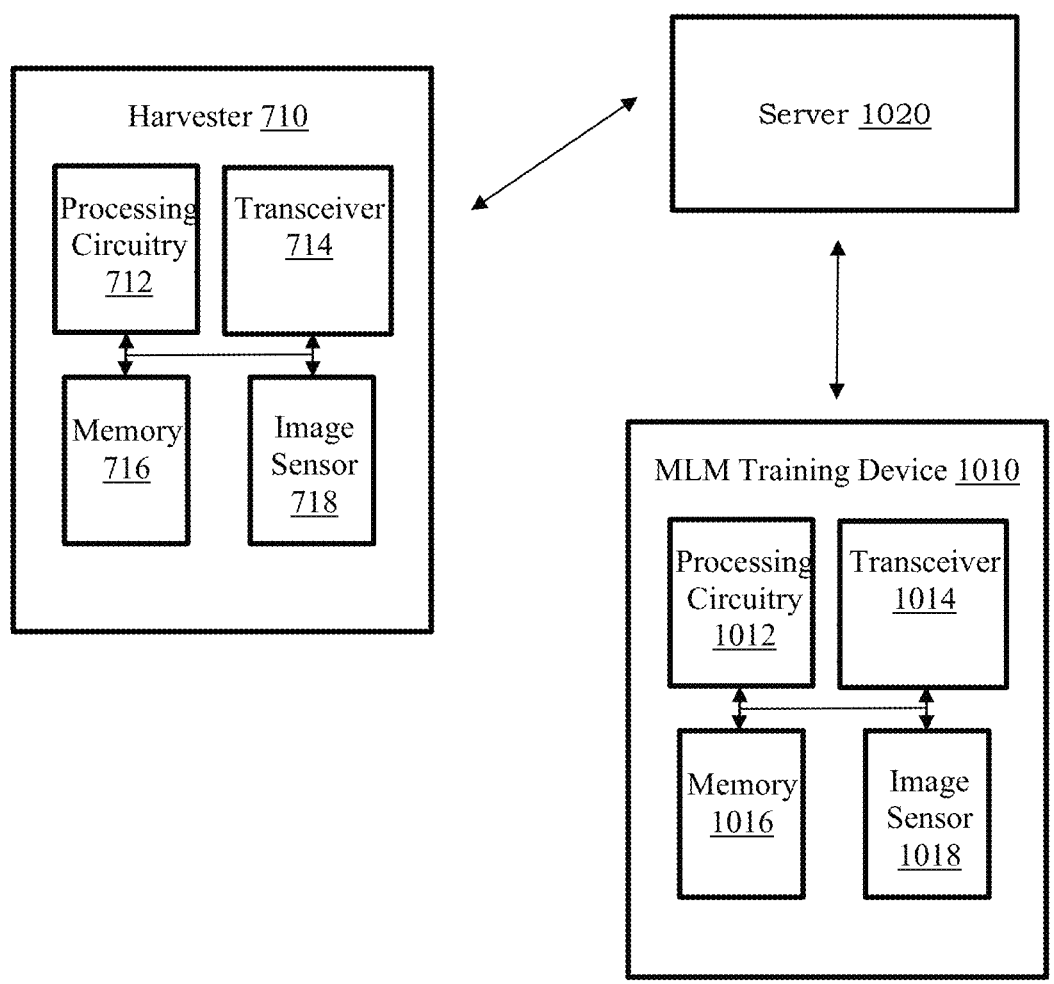
FIG. 10 is a diagram of a device and system for training a machine learning model according to some example embodiments.

Referring to FIG. 10, an MLM Training Device 1010 is illustrated. The MLM Training Device 1010 is a device external to the harvester 710 that may perform the methods discussed in association with FIGS. 6-7 for training the blade wear detection MLM 350. For example, the MLM Training Device 1010 may perform operations 552, 554, 556, 558, 560 and/or 562 discussed in association with FIG. 6, and/or the operations discussed in association with FIG. 7. The MLM Training Device 1010 may include processing circuitry 1012, a transceiver 1014, a memory 1016 and/or an image sensor 1018.

According to some example embodiments, the MLM Training Device 1010 may receive a set of reference images (e.g., the labeled image set 352 discussed in association with FIG. 6, and/or the reference images 1-n discussed in association with FIG. 7) via the transceiver 1014. The processing circuitry 1012 may train the blade wear detection MLM 350 according to the methods discussed in association with FIG. 6 and/or FIG. 7. The set of reference images, the blade wear detection MLM 350 and/or blade wear signals output by the blade wear detection MLM 350 may be stored in the memory 1016.

According to some example embodiments, the set of reference images may be obtained by the MLM Training Device 1010 using the image sensor 1018. For example, the image sensor 1018 may capture images of sample billets provided for use in training the blade wear detection MLM 350, and use these captured images as the set of reference images. According to some example embodiments, the MLM Training Device 1010 may include a subset of the components of the harvester 10, such as a chopper, a separator and/or a conveyor (the same as, or similar to, the chopper 28, the separator 55 and/or the conveyor 56), or all of the components of the harvester 10. Sample cane provided for use in training the blade wear detection MLM 350 may be fed into the chopper, the resulting billets may pass through the separator and be deposited onto the conveyor for imaging by the image sensor 1018.

According to some example embodiments, the MLM Training Device 1010 may be connected to a server 1020 via a first communication link, and the server 1020 may be connected to the harvester 710 via a second communication link. Each of the first communication link and second communication link may be a wired link and/or a wireless link. For example, each of the first communication link and second communication link may be an Ethernet link, an 802.11 (WiFi) link, a Radio Frequency (RF) (e.g., cellular) link, a Transmission Control Protocol/Internet Protocol (TCP/IP) link, a Universal Serial Bus (USB) link, a Bluetooth™ link, or any combination thereof. The MLM Training Device 1010 may receive the set of reference images via the first communication link. According to some example embodiments, the set of references is obtained from a database stored in a memory of the server 1020. According to some example embodiments, the set of reference images may be generated by the harvester 710, and the server 1020 may receive the set of reference images from the harvester 710 via the second communication link. According to some example embodiments, the server 1020 may be the same as, or similar to, the server 720 discussed in association with FIG. 8.

According to some example embodiments, the trained MLM 350 may be recorded on a non-transitory computer-readable medium (e.g., a flash memory, a removable disk, a CD ROM, etc.). The trained MLM 350 may be transferred to, and installed on, a memory of the harvester 10 (e.g., the memory of the control unit 68) using the non-transitory computer-readable medium. According to some example embodiments, the trained MLM 350 may be transmitted to the server 1020 via the first communication link. The trained MLM 350 may be stored in a memory of the server 1020. The server 1020 may transmit the trained MLM 350 to the harvester 710 via the second communication link. The control unit 68 of the harvester 710 may install the trained MLM 350 received via the second communication link to the memory of the harvester (e.g., the memory of the control unit 68). The trained MLM 350 may be used (e.g., by the control unit 68) to detect a blade wear level of the blades (of the chopper 28).

According to some example embodiments, the server 1020 may install the trained MLM 350 to the memory of the server 1020 in addition to, or without, transmitting the trained MLM 350 to the harvester 710. The harvester 710 may transmit images of billets captured by the image sensor 718 to the server 1020 via the second communication link. The server 1020 may input the images of the billets received from the harvester 710 into the trained MLM 350, and transmit a resulting blade wear signal to the harvester 710 via the second communication link. Accordingly, the server 1020 may be deployed as a Software as a Service (SaaS) system.

According to some example embodiments, the server 1020 may install the trained MLM 350 to the memory of the server 1020 in addition to transmitting the trained MLM 350 to the harvester 710. The harvester 710 may occasionally (e.g., periodically) transmit images of billets captured by the image sensor 718 to the server 1020. The server 1020 may re-train (e.g., update) the trained MLM 350 using the images of billets received from the harvester 710 according to the methods used by the MLM Training Device 1010. The server 1020 may occasionally (e.g., periodically) transmit the re-trained MLM 350 of the harvester 710 may install the re-trained MLM 350 received via the second communication link to the memory of the harvester (e.g., the memory of the control unit 68. The re-trained MLM 350 may be used (in combination with the control unit 68) to detect a blade wear level of the blades (of the chopper 28).

According to some example embodiments, the harvester 710 may re-train (e.g., update) the trained MLM 350 using the images of billets obtained using the image sensor 718 according to the methods used by the MLM Training Device 1010. The re-trained MLM 350 may be used (in combination with the control unit 68) to detect a blade wear level of the blades (of the chopper 28).

According to some example embodiments, operations described herein as being performed by the MLM Training Device 1010 and/or the server 1020 may be performed by processing circuitry (e.g., the processing circuitry 1012).

According to some example embodiments, the memory 1016 and/or a memory of the server 1020, may be a tangible, non-transitory computer-readable medium, such as a Random Access Memory (RAM), a flash memory, a Read Only Memory (ROM), an Electrically Programmable ROM (EPROM), an Electrically Erasable Programmable ROM (EEPROM), registers, a hard disk, a removable disk, a Compact Disk (CD) ROM, any combination thereof, or any other form of storage medium known in the art.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

It will be understood that when an element is referred to as being "connected" or "coupled" to another element, it may be directly connected or coupled to the other element or intervening elements may be present. As used herein the term "and/or" includes any and all combinations of one or more of the associated listed items.

The invention claimed is:

1. A non-transitory computer-readable medium storing instructions that, when executed by at least one processor, cause the at least one processor to:
   obtain a first signal using a trained machine learning model, the first signal being based on an input image, the input image being an image of a plant cut by a blade, the input image being captured during a harvesting operation in which the plant is cut by the blade, and the first signal indicating a wear level of the blade;
   determine whether a level of the first signal is greater than or equal to a threshold without stopping the harvesting operation; and
   control a rotational speed of the blade in response to determining that the level of the first signal is greater than or equal to the threshold, the control of the rotational speed of the blade being performed without stopping the harvesting operation.

2. The non-transitory computer-readable medium of claim 1, wherein the trained machine learning model was trained using a plurality of reference images, each of the plurality of reference images being an image of a respective plant cut by a respective blade, and each of the plurality of reference images being associated with a respective blade wear level.

3. The non-transitory computer-readable medium of claim 2, wherein the respective blade wear level is based on one of a billet length of the respective plant, a cleanness of the cut of the respective plant or a measure of dullness of the respective blade.

4. The non-transitory computer-readable medium of claim 1, wherein the instructions, when executed by the at least one processor, cause the at least one processor to:
   obtain an ordered set of images captured of plants cut by a first blade, a first image among the set of images corresponding to a lowest blade wear level of the first blade, and a last image among the set of images corresponding to a blade wear level of the first blade exceeding the threshold; and train a machine learning model based on the set of images to obtain the trained machine learning model.

5. The non-transitory computer-readable medium of claim 1, wherein the plant is a billet of sugar cane.

6. The non-transitory computer-readable medium of claim 1, wherein
the threshold is one of a plurality of thresholds, and each respective threshold among the plurality of thresholds corresponds to a respective alert signal among a plurality of alert signals; and
the instructions, when executed by the at least one processor, cause the at least one processor to,
generate the respective alert signal in response to determining the first signal is greater than or equal to the respective threshold corresponding to the respective alert signal, and
output the respective alert signal.

7. The non-transitory computer-readable medium of claim 6, wherein the instructions, when executed by the at least one processor, cause the at least one processor to:
output the respective alert signal to a server; and
receive the plurality of thresholds from the server.

8. The non-transitory computer-readable medium of claim 1, wherein the instructions, when executed by the at least one processor, cause the at least one processor to receive the trained machine learning model from an external source.

9. The non-transitory computer-readable medium of claim 1, wherein the instructions, when executed by the at least one processor, cause the at least one processor to:
output the input image to a server;
receive a re-trained machine learning model from the server; and
obtain a third signal using the re-trained machine learning model.

10. The non-transitory computer-readable medium of claim 1, wherein the instructions, when executed by the at least one processor, cause the at least one processor to:
re-train the trained machine learning model based on the input image to obtain a re-trained machine learning model; and
obtain a third signal using the re-trained machine learning model.

11. The non-transitory computer-readable medium of claim 1, wherein the instructions, when executed by the at least one processor, cause the at least one processor to reduce a ground speed of a vehicle in response to determining the level of the first signal is greater than or equal to the threshold.

12. The non-transitory computer-readable medium of claim 1, wherein the instructions, when executed by the at least one processor, cause the at least one processor to increase the rotational speed of the blade in response to determining the level of the first signal is greater than or equal to the threshold.

13. The non-transitory computer-readable medium of claim 1, wherein the instructions, when executed by the at least one processor, cause the at least one processor to:
train a machine learning model using a plurality of reference images to obtain the trained machine learning model, each of the plurality of reference images being an image of a respective plant cut by a blade;
re-train the trained machine learning model based on the input image to obtain a re-trained machine learning model; and
obtain a third signal using the re-trained machine learning model.

14. A device for blade wear monitoring, the device comprising:
processing circuitry configured to,
obtain a first signal based on an input image using a trained machine learning model, the input image being an image of a plant cut by a blade, the input image being captured during a harvesting operation in which the plant is cut by the blade, and the first signal indicating a wear level of the blade,
determine whether a level of the first signal is greater than or equal to a threshold without stopping the harvesting operation, and
control a rotational speed of the blade in response to determining that the level of the first signal is greater than or equal to the threshold, the control of the rotational speed of the blade being performed without stopping the harvesting operation.

15. The device of claim 14, wherein the trained machine learning model was trained using a plurality of reference images, each of the plurality of reference images being an image of a respective plant cut by a respective blade, and each of the plurality of reference images being associated with a respective blade wear level.

16. The device of claim 15, wherein the respective blade wear level is based on one of a billet length of the respective plant, a cleanness of the cut of the respective plant or a measure of dullness of the respective blade.

17. The device of claim 14, wherein the processing circuitry is configured to:
obtain an ordered set of images captured of plants cut by a first blade, a first image among the set of images corresponding to a lowest blade wear level of the first blade, and a last image among the set of images corresponding to a blade wear level of the first blade exceeding the threshold; and
train a machine learning model based on the set of images to obtain the trained machine learning model.

18. The device of claim 14, wherein the plant is a billet of sugar cane.

19. The device of claim 14, wherein
the threshold is one of a plurality of thresholds, and each respective threshold among the plurality of thresholds corresponds to a respective alert signal among a plurality of alert signals; and
the processing circuitry is configured to,
generate the respective alert signal in response to determining the first signal is greater than or equal to the respective threshold corresponding to the respective alert signal,
output the respective alert signal to a server, and
receive the plurality of thresholds from the server.

20. The device of claim 14, wherein the processing circuitry is configured to:
output the input image to a server;
receive a re-trained machine learning model from the server; and
obtain a third signal using the re-trained machine learning model.

21. The device of claim 14, wherein the processing circuitry is configured to:
re-train the trained machine learning model based on the input image to obtain a re-trained machine learning model; and
obtain a third signal using the re-trained machine learning model.

22. The device of claim 14, wherein the processing circuitry is configured to reduce a ground speed of a vehicle in response to determining the level of the first signal is greater than or equal to the threshold.

23. The device of claim 14, wherein the processing circuitry is configured to increase the rotational speed of the blade in response to determining the level of the first signal is greater than or equal to the threshold.

\* \* \* \* \*